United States Patent [19]

Kilmurry et al.

[11] 4,043,752
[45] Aug. 23, 1977

[54] PHENYLAZOAMINOPHENYLPYRAZOLE ACID DYE SOLUTIONS CONTAINING TWO NONIONIC SURFACTANTS

[75] Inventors: Lindsay Kilmurry, Newark, Del.; Howard Kirby Urion, Woodstown, N.J.

[73] Assignee: E. I. Du Pont de Nemours and Company, Wilmington, Del.

[21] Appl. No.: 641,373

[22] Filed: Dec. 17, 1975

[51] Int. Cl.$^2$ .............. D06P 1/06; D06P 1/645; D06P 3/24
[52] U.S. Cl. .................... 8/41 B; 8/41 R; 8/84; 8/88; 260/163
[58] Field of Search .............. 260/163; 8/84, 41 R, 8/88, 41 B, 41 C, 41 A

[56] References Cited

U.S. PATENT DOCUMENTS

| 1,982,045 | 12/1934 | Payne et al. | 260/163 X |
|---|---|---|---|
| 2,674,619 | 4/1954 | Lundsted | 260/485 |
| 3,012,843 | 12/1961 | Gangneux et al. | 260/163 X |
| 3,071,427 | 1/1963 | Buehler et al. | 8/22 |
| 3,324,106 | 6/1967 | De Peloux et al. | 260/160 |
| 3,549,612 | 12/1970 | Clarke | 260/160 |
| 3,803,122 | 4/1974 | Kilmurry | 260/163 |

OTHER PUBLICATIONS

Wyandotte Chemicals Corporation, 6th Edition, "Data Sheet on Pluronic Polyols", 8 pages.

Primary Examiner—Floyd D. Higel
Attorney, Agent, or Firm—James A. Costello

[57] ABSTRACT

Dye solutions having excellent Kusters dye bath stability comprising, by weight, i. 10% to 20% of a dye of the formula

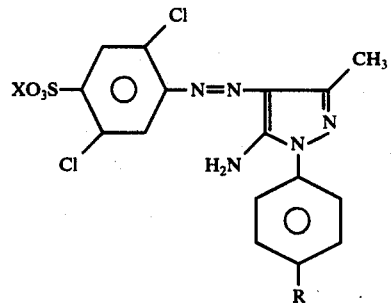

wherein R is H or Cl, and X is a mixture of di- and tri-$C_1$-$_4$alkanolammonium,
ii. 15% to 30% of n-butanol,
iii. 10% to 20% of ethyleneglycol,
iv. 10% to 20% of nonionic polyethylene oxide-polypropylene oxide copolymer surfactant,
v. 5% to 10% of nonionic polyethoxylated aliphatic amine surfactant, and
vi. 0 to 50% water.

14 Claims, No Drawings

PHENYLAZOAMINOPHENYLPYRAZOLE ACID DYE SOLUTIONS CONTAINING TWO NONIONIC SURFACTANTS

BACKGROUND OF THE INVENTION

1. Field of the Invention

This invention concerns solutions of the di- and tri-$C_{1-4}$alkanolammonium salt forms of the dyes, singly or in admixture: 5-amino-4-(2',5'-dichloro-4'-sulfophenylazo)-3-methyl-1-phenylpyrazole and 5-amino-4-(2',5'-dichloro-4'-sulfophenylazo)-3-methyl-1-p-chlorophenylpyrazole.

2. Description of the Prior Art

The particular dye component employed in the solutions of this invention wherein R is Cl and X is $C_{1-4}$alkanolammonium is described in coassigned U.S. Pat. No. 3,803,122, the pertinent portion of said patent being incorporated herein by reference.

U.S. Pat. No. 3,071,427 teaches particular metallized acid dyes (which are not contemplated herein) employed in the presence of polyethoxylated aliphatic amine employed as a dyeing assistant. U.S. Pat. No. 2,674,619 discloses polyethylene oxide-polypropylene oxide glycol copolymers. Dye solutions are known of the dyes described herein in aqueous butanol-ethylene glycol solvents.

Nothing in the art suggests the particularly defined dye solutions of this invention, said dye solutions being characterized by excellent Kusters dye bath stability. The dye solutions of this invention maintain their storage stability even at high concentrations, they do not separate out under normal storage and use temperatures, and they are easily measured out in controlled amounts.

SUMMARY OF THE INVENTION

This invention concerns dye solutions comprising, by weight, i. 10% to 20% of a dye of the formula

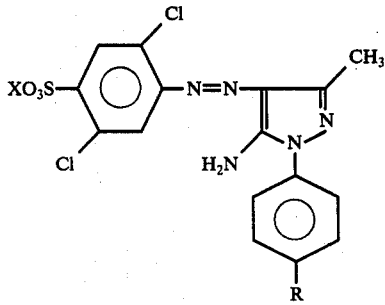

wherein R is H or Cl, and X is a mixture of di- and tri-$C_{1-4}$alkanolammonium,
ii. 15% to 30% of n-butanol,
iii. 10% to 20% of ethyleneglycol,
iv. 10% to 20% of nonionic polyethylene oxide-polypropylene oxide copolymer surfactant,
v. 5% to 10% of nonionic polyethoxylated aliphatic amine surfactant, and
vi. 0 to 50% water.

Dye solution of the dye described above wherein R is Cl are preferred since they have better buildup and exhaust properties than those wherein R is H. The term "dye" employed hereafter should be understood to refer to the above-described salt forms thereof.

The most preferred dye solutions comprise, by weight, 15% to 17% of the dye wherein $R_1$ is Cl and X is a mixture of di- and triethanolammonium, 18% to 20% of n-butanol, 13% to 15% of ethylene glycol, 10% to 12% of a polyethylene oxidepolypropylene oxide copolymer containing 10% of ethylene oxide and 90% of propylene oxide, 5% to 7% of the condensation product of one mole of a $C_{16-18}$tallowamine and 16 moles of ethylene oxide, and 30% to 35% of water.

It is pointed out that small amounts of ingredients other than those specifically described above can be present in the dye solutions provided they do not interfere with dye properties, e.g., residual alkanolamines, urea, etc. may be present.

It will be appreciated by those skilled in the art that if little or no water is present in the dye solutions (although such dye solutions are contemplated herein) the cost of said dye solutions may be impracticably high. On the other hand, large amounts of water of, say, 40% to 50% by weight (also contemplated herein) may tend to cause some dye to precipitate. Thus, ideal amounts of water are more than about 25% and less than about 40%.

DETAILS OF THE INVENTION

The invention dye solutions are prepared by diazotizing 2,5-dichloroaniline-4-sulfonic acid with sodium nitrite in dilute aqueous sulfuric acid at a temperature of from 0° to 25° C. The diazonium salt thus formed is isolated by filtration and washed with water to remove inorganic impurities. The 5-amino-3-methylphenyl (or p-chlorophenyl) pyrazole coupling component is dissolved in a mixture of ethylene glycol, n-butanol, a nonionic polyethylene-polypropylene oxide copolymer surfactant and a nonionic polyethoxylated aliphatic amine surfactant. The solid diazonium salt is added to the coupler solution in small portions at a temperature from about 0° to 30° C. Coupling is accelerated by adding a trialkanolamine in small portions to a pH range of 3.8 to 4.2. When all of the diazonium salt has been added, urea can be added to further enhance solution stability. The dye is converted to a solution of its mixed di- and trialkanolamine salts by the addition of a dialkanolamine to a final pH of 7.5 to 8.0. The dye solution is then diluted with water to standard strength and then transferred to suitable storage containers.

Alternatively, a slurry of the diazonium salt in ethylene glycol can be added to the coupler solution containing the aminopyrazole, n-butanol and the nonionic surfactants, or, the nonionic surfactants can be added after coupling to the solution containing dye, ethylene glycol and n-butanol.

Operable di- and tri-$C_{1-4}$alkanolamines include diethanolamine, triethanolamine, N-methyl- or N-ethyldiethanolamine, diisopropanolamine and triisopropanolamine. Mixtures of di- and triethanolamine provide excellent dye solubility and are particularly preferred herein. The particular $C_{1-4}$alkanol-ammonium cations employed herein have no effect on the coloring properties of the dye.

The combined mixed $C_{1-4}$alkanolamines are present in molar amounts at least equivalent to or up to 40% in excess of the amount of dye present. The amount of tri-$C_{1-4}$alkanolamine present ranges from 60% to 70% by weight, whereas the amount of di-$C_{1-4}$alkanolamine ranges from 30% to 40% by weight of the total $C_{1-4}$alkanolamine mixture.

The pyrazole coupling components can be prepared by methods well-known in the art, e.g. by reacting 3-aminocrotonitrile or cyanoacetone with phenyl or p-chlorophenylhydrazine under acid conditions.

The nonionic polyethylene oxide-polypropylene oxide copolymer surfactants have the general formula

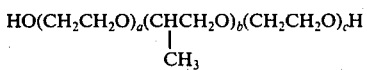

wherein $a + c$ is 4 to 45 and $b$ is 16 to 42. These block copolymers are prepared by adding propylene oxide to the two hydroxyl groups of a propylene glycol nucleus. The resultant hydrophobic base can be made to any controlled length varying from 800 to several thousands in molecular weight. Ethylene oxide is then added to both ends of this hydrophobic base. The hydrophilic ethylene oxide groups are controlled in length to constitute anywhere from 10% to 80% by weight of the copolymer molecule.

Particularly preferred herein is the polyethylene oxidepolypropylene oxide copolymer having a hydrophobic polypropylene oxide molecular weight of about 1750 and containing about 10% by weight of ethylene oxide and about 90% by weight of propylene oxide.

The nonionic polyethoxylated aliphatic amine surfactants have the general formula

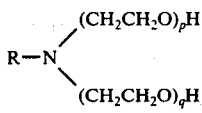

wherein R is an unbranched aliphatic hydrocarbon radical containing at least 12, and advantageously 16 to 20, carbon atoms and $p$ and $q$ are each whole numbers such that the sum of $p + q$ is between 8 to 20.

Particularly preferred herein is the polyethoxylated aliphatic amine obtained by reacting commercial tallowamine with 16 moles of ethylene oxide per mole of amine. Tallowamine is prepared from naturally-occurring materials and is commercially available as a mixture of $C_{16}$ and $C_{18}$ straight-chain saturated aliphatic amines, with a small amount of unsaturated chain material also being present.

The organic solvents employed in the dye solutions of this invention are aliphatic ethers or alcohols, such as n-butanol and ethylene glycol. Mixtures of n-butanol and ethylene glycol ranging from 2 to 1 to 1 to 1 by weight are useful. Particularly preferred is a 1.4 to 1 n-butanol-ethylene glycol solvent mixture.

The invention dye solutions are of particular importance for the dyeing of carpet made from synthetic polyamide fibers by the continuous Kusters dyeing process. Tinctorially strong, greenish-yellow dyeings having excellent lightfastness are obtained. Although poly(hexamethylene-adipamide) is the preferred nylon substrate, other types of nylon also can be dyed therewith, such as poly(m-xylylene adipamide), poly(xylylene sebacamide), polycaprolactam and the like. The invention dye solutions can be mixed, cold or hot, with water or advantageously with the dye bath liquor. The combined nonionic surfactants greatly enhance dye bath stability, and the dye shows minimal tendency to gel or separate from the dye bath either immediately or after extended periods of storage.

The following Examples illustrate the invention. Percentages are based on weight.

EXAMPLE 1

First, a wet paste of 2,5-dichloroaniline-4-sulfonic acid (367 g, 39.6% active ingredient, 0.6 mole) containing approximately 30% of free sulfuric acid was slurried in 900 ml of water and 120 ml (0.6 mole) of 5N sodium nitrate was added dropwise at room temperature. A positive nitrite test was maintained for 45 minutes and the excess nitrite was destroyed by the addition of a small amount of urea. The diazonium salt was filtered and washed with 100 ml of water to yield 169.5 g of wet diazo product.

Then, 5-amino-3-methyl-1-(p-chlorophenyl)pyrazole (240 g, 52% active ingredient, 0.6 mole) was dissolved in 652 g of a 2 to 1 mixture of n-butanol and ethylene glycol. A polyethylene oxide-polypropylene oxide copolymer containing 10% ethylene oxide and 90% propylene oxide (144 g) was added and the solution was cooled 10° C. The wet diazonium salt was added to the coupler solution in four equal portions at 7° to 10° C. After each diazo addition, 18 g of triisopropanolamine was added. Urea (86.4 g) was then added, followed by 39.5 g of diethanolamine to give a final pH of 7.5. The solution was heated to 50° C and clarified to give 1394.1 g of yellow solution.

To 1244 g of the yellow solution was added 138 g of a nonionic surfactant derived from the condensation of one mole of a $C_{16-18}$tallowamine and 16 moles of ethylene oxide giving a final dye solution containing approximately 15.6% of the dye of the aforesaid general formula wherein R is Cl as the mixed triisopropanolamine-diethanolamine salt, 14% of ethylene glycol, 28% of n-butanol, 10.3% of polyethylene oxide-polypropylene oxide copolymer, 5.6% of urea, 10% of polyethoxylated $C_{16-18}$tallowamine and 10% of water. The remainder consisted of a mixture of residual triisopropanolamine and diethanolamine. The resultant dye solution had satisfactory storage stability at 0° C, room temperature and 50° C after 3 months and had excellent Kusters dye bath stability.

EXAMPLES 2 AND 3 AND COMPARISON

Comparison

A wet paste of 2,5-dichloroaniline-4-sulfonic acid (367 g, 39.6% active ingredient) containing approximately 30% of free sulfuric acid was slurried in 900 ml of water and diazotized with 123 ml of 39% aqueous sodium nitrite as described in Example 1. The diazonium salt was filtered and washed with water to yield 195 g of wet diazo product.

The wet diazonium salt (97.2 g) was added in four equal portions (24.3 g each) to a solution of 120 g (52% active ingredient) of 5-amino-3-methyl-1-(p-chlorophenyl)pyrazole in 326 g of 2 to 1 n-butanol-ethylene glycol and 72 g of a polyethylene oxide-polypropylene oxide copolymer containing 10% ethylene oxide and 90% propylene oxide at 8° to 12° C. After each diazo addition, 9 g of triisopropanolamine was added. Urea (86.4 g) was then added, followed by 24.2 g of diethanolamine to give a final pH of 7.5. The solution was heated to 50° C and clarified to give 573.7 g of yellow solution.

A 225 g portion of the aforesaid solution was diluted with water to give 280 g of a solution containing approximately 15.5% of the dye of the aforesaid general formula wherein R is Cl as the mixed triisopropanolamine-diethanolamine salt, 30% of n-butanol, 15% of ethylene glycol, 10% of polyethylene oxide-polypropylene oxide copolymer, 12% of urea and 8.6% of water. The remainder was a mixture of triisopropanolamine and diethanolamine. The solution had poor Kusters dye bath stability.

EXAMPLE 2

To a 25 g portion of the aforesaid dye solution was added 1.25 g of the condensation product of one mole of $C_{16-18}$tallowamine and 16 moles of ethylene oxide. The resultant dye solution contained 14.8% of the dye of the aforesaid general formula wherein R is Cl as the mixed triisopropanolamine-diethanolamine salt, 28.9% of n-butanol, 14.4% of ethylene glycol, 9.5% of polyethylene oxide-polypropylene oxide copolymer, 11.5% of urea, 4.8% of polyethoxylated $C_{16-18}$tallowamine and 8.2% of water. This dye solution had excellent Kusters dye bath stability.

EXAMPLE 3

To a second 25 g portion of the dye solution of the Comparison was added 2.5 g of polyethoxylated $C_{16-18}$tallowamine to yield a dye solution containing 14.1% of the dye of the aforesaid general formula wherein R is Cl as the mixed triisopropanolamine-diethanolamine salt, 27.6% of n-butanol, 13.8% of ethylene glycol, 9.1% of polyethylene oxide-polypropylene oxide copolymer, 11% of urea, 9.1% of polyethoxylated $C_{16-18}$tallowamine and 7.8% of water. The dye solution containing both the polyethoxylated $C_{16-18}$tallowamine and the polyethylene oxide-polypropylene oxide copolymer had excellent Kusters dye bath stability.

EXAMPLE 4

First, a wet paste of 2,5-dichloroaniline-4-sulfonic acid (855 g, 34% active ingredient, 1.2 moles) containing approximately 30% of free sulfuric acid was slurried in 1800 ml of water. The slurry was cooled to 9° C and 212 ml (1.2 moles) of 39% aqueous sodium nitrite was added dropwise over 20 minutes at 7° to 19° C. A positive nitrite test was maintained for 3 hours. The diazonium salt was then filtered and washed with water to yield 351.3 g of wet diazo product.

A solution of 5-amino-3-methyl-1-(p-chlorophenyl)-pyrazole (292g, 85.4% active ingredient, 1.2 moles) in 605 g of n-butanol, 432 g of ethylene glycol (1.4 to 1 ratio of n-butanol to ethylene glycol) and 339 g of water was cooled to 0° C. The diazonium salt was added to the coupler solution in small portions over about 30 minutes at 0° to 27° C. Triisopropanlamine (241 g) was then added in small portions over approximately a 2 hour period at 27° to 34° C. The pH of the coupling mixture after the triisopropanolamine addition was 4.2. The pH was adjusted to 7.9 by the addition of 63 g of diethanolamine. A total of 2216 g of yellow dye solution was obtained.

To 554 g of the aforesaid dye solution was added 82.2 g of a polyethylene oxide-polypropylene oxide copolymer containing 10% of ethylene oxide and 90% of propylene oxide, 49.3 g of the condensation product of one mole of $C_{16-18}$tallowamine and 16 moles of ethylene oxide and 136.5 g of water. The solution was heated to 50° to 60° C and clarified to yield 813 g of yellow dye solution containing approximately 15.6% of dye of the aforesaid general formula wherein R is Cl as the mixed triisopropanolamine-diethanolamine salt, 19% of n-butanol, 13.6% of ethylene glycol, 10% of polyethylene oxide-polypropylene oxide copolymer, 6% of polyethoxylated $C_{16-18}$tallowamine and 30% of water. The remainder was residual triisopropanolamine and diethanolamine. The solution had excellent Kusters dye bath stability.

EXAMPLE 5

To a second 554 g portion of the dye solution prepared as described in Example 4 was added 82.2 g of a polyethylene oxide-polypropylene oxide copolymer containing 10% of ethylene oxide and 90% of propylene oxide, 49.3 g of the condensation product of one mole of $C_{16-18}$tallowamine and 16 moles of ethylene oxide, 82.2 g of urea and 54.3 g of water. The solution was heated to 50° to 60° C and clarified to yield 812 g of yellow dye solution containing approximately 15.5% of the dye of the aforesaid general formula wherein R is Cl as the mixed triisopropanolamine-diethanolamine salt, 19% of n-butanol, 13.6% of ethylene glycol, 10% of polyethylene oxide-polypropylene oxide copolymer, 6% of polyethoxylated $C_{16-18}$tallowamine, 10% of urea and 30% of water. Residual triisopropanolamine and diethanolamine made up the remainder. The dye solution had good Kusters dye bath stability.

EXAMPLE 6

A mixture of 922 g (1.5 moles, 39.4% active ingredient) of a wet paste of 2,5-dichloroaniline-4-sulfonic acid containing approximately 30% of free sulfuric acid and 750 ml of water was diazotized with 266 ml (1.5 moles) of 39% aqueous sodium nitrite at 7° to 31° C as described in Example 4. The resultant diazonium salt was filtered and washed with water to yield 512.4 g of wet product.

The diazonium salt was added in portions over a 45 minute period to a solution of 634 g (1.5 moles, 49.1% active ingredient) of 5-amino-3-methyl-1-(p-chlorophenyl)pyrazole in 756 g of n-butanol, 540 g of ethylene glycol (1.4 to 1 ratio of n-butanol to ethylene glycol), 400 g of a polyethylene oxide-polypropylene oxide copolymer containing 10% ethylene oxide and 90% propylene oxide and 240 g of the condensation product of one mole of $C_{16-18}$tallowamine and 16 moles of ethylene oxide at from 10° to 32° C. Triethanolamine (195 g) was added in portions over a 2 hour period at 25° to 30° C to give a pH of 4.2. The pH was then raised to 8.0 by the addition of 64.6 g of diethanolamine.

The resultant yellow solution was clarified to yield 3345 g of solution product containing approximately 15.4% of the dye of the aforesaid general formula wherein R is Cl as the mixed triethanolamine-diethanolamine salt, 19% of n-butanol, 13.6% of ethylene glycol, 10% of polyethylene oxide-polypropylene oxide copolymer, 6% of polyethoxylated $C_{16-18}$tallowamine and 34% of water. The remainder consists of residual triethanolamine and diethanolamine. The dye solution exhibited good storage stability after 4 months at 0° C, at room temperature and at 50° C, and had excellent Kusters dye bath stability.

EXAMPLE 7

The procedure of Example 6 was repeated, except that the 2,5-dichloroaniline-4-sulfonic acid diazonium salt was slurried in the ethylene glycol solvent and the slurry added to a solution of the 5-amino-3-methyl-1-(p-chlorophenyl)pyrazole in n-butanol containing the polyethylene oxide-polypropylene oxide copolymer and the polyethoxylated $C_{16-18}$ tallowamine.

KUSTERS DYEING

The continuous processing of tufted nylon carpet has become commonplace during recent years and covers such diverse applications as dyeing, printing and sprinkle dyeing. While a number of continuous dyeing units have been developed, all have been designed to apply dye to the carpet by some means other than by padding, the general principle being to deposit a relatively high volume of dye bath onto the material. This has been accomplished in several ways, such as by immersion through a bath without squeezing, by absorption of dye by the carpet from a trough, and by a controlled flow of dye bath onto the fabric surface. This last system has proved to be very popular for dyeing solid shades and forms the basis for the commercial continuous Kusters dyeing process.

Amidon, in the "American Association of Textile Chemists and Colorists," Vol. 1, 1969, pages 40 to 42, discusses the mechanics of Kusters continuous dyeing. In essence, the continuous Kusters dyeing of nylon carpet consists of four major operations: wetout, dye application, steaming and washing. The dye solutions of this invention do not separate from other Kusters dye bath ingredients thus aiding the achievement of even carpet dyeing.

An immersion-type wetout, using squeeze rolls that express the water uniformly, is most commonly used. Uniform squeezing of the carpet after wetout insures that even dye penetration will be obtained across the entire width of the carpet. Generally, a room temperature wetout bath containing sufficient wetting agent to wet the carpet thoroughly is employed. Nonionic wetting agents are usually preferred to assure good compatibility of the total system.

A suitable dye application device consists of a steel roll which revolves in a pan containing the dye solution. A doctor blade is placed in contact with the roll so that it picks up the dye bath liquor from the roll and delivers it to the face of the carpet. The amount of dye delivered to the carpet is controlled by adjusting the viscosity of the dye bath, the revolutions per minute (rpm) of the applicator roll and the linear speed of the carpet. Thus, the same volume of dye bath can be furnished over a long period of time as well as from run to run. In most cases, dye bath pickup ranges from 200% to 500% depending upon the carpet weight and style.

The dye is then fixed on the nylon carpet by steaming for 6 to 8 minutes at 100° to 105° C in a festoon-loop type steamer. Following dye fixation, an efficient aqueous wash is provided to remove surfactant, thickener and any unfixed dye.

Dye bath viscosity is adjusted with a suitable thickening agent for two principal reasons. The first is to enable sufficient pickup by the applicator roll so that the proper amount of dye bath is delivered to the material. Since the revolving applicator roll has practical limitations, it is necessary to control viscosity to deliver the proper volume of dye bath. The applicator roll can be run at a maximum of about 160 to 170 rpm depending on the dye bath viscosity. Higher speeds have a tendency to form ridges on the dye film and give uneven deposition of dye on the carpet.

Viscosity also plays a part in holding the dye liquor in place until the carpet enters the steamer. If the bath viscosity is too low, the dye liquor may run through the carpet and drip off before the carpet enters the steamer, making reproducibility difficult and resulting in excessive dye bath costs. Commercial high-viscosity natural gums which can be mixed directly in water and which hydrate to 80% to 90% of their full viscosity serve as satisfactory thickening agents for Kusters application.

TYPICAL KUSTERS DYEING PROCEDURE

Using Kusters equipment, a 6-inch wide length of medium dyeable nylon carpeting (T846) tufted onto a polypropylene backing was run through a wetout bath at 60° to 80° C containing 1.5 grams per liter of an organic alcohol extended with ethylene oxide at a pickup of about 100%. The carpeting was then continuously treated with an aqueous dye bath composition at 27° C containing the 15.6% dye solution of Example 1:6.4 grams
an organic alcohol extended with ethylene oxide: 0.25 gram
a purified natural gum thickener: 2.0 grams
acetic acid: 3.0 grams
water: to 1 liter
monosodium phosphate: to adjust the pH to 5.

Pickup was about 400% based on the weight of the carpet. The carpeting was then run through a steamer at 100° C, the dwell time being about 8 minutes. Finally, the carpeting was rinsed thoroughly with water and dried. A uniform deep yellow shade was obtained.

EXAMPLES 8 AND 9 AND COMPARISONS

A. A slurry of a wet paste of 2,5-dichloroaniline-4-sulfonic acid containing approximately 30% of free sulfuric acid (407 g, 35.7% active ingredient, 0.6 mole) in 900 ml of water was diazotized with 120 ml (0.6 mole) of 5N sodium nitrite as described in Example 1. The resultant diazonium salt was added in four equal portions (49.5 g each) to a solution of 251 g (49.7% active ingredient, 0.602 mole) of 5-amino-3-methyl-1-(p-chlorophenyl)-pyrazole in 652 g of 2 to 1 n-butanol-ethylene glycol at 7° to 10° C. After each diazo addition, triisopropanolamine (18 g) was added. After stirring for 17 hours at room temperature, 86.4 g of urea and 39.5 g of diethanolamine were added. The final pH was 7.5. The solution was heated to 50° C and clarified to yield 1204.2 g of a solution containing the dye of the aforesaid general formula wherein R is Cl as the mixed triisopropanolamine-diethanolamine salt, having an absorptivity ($a_{max}$) of 8.64 liters $g^{-1}cm^{-1}$ at a wavelength ($\lambda_{max}$) of 425 m$\mu$.

B. A wet paste of 2,5-dichloroaniline-4-sulfonic acid (407 g, 35.7% active ingredient, 0.6 mole) containing approximately 30% of free sulfuric acid was diazotized and coupled to 103.8 g (0.601 mole) of 5-amino-3-methyl-1-phenyl-pyrazole in 652 g of 2 to 1 n-butanol-ethylene glycol as described in (A) above. A yield of 1086.8 g of a solution containing the dye of the aforesaid general formula wherein R is H as the mixed triisopropanolamine-diethanolamine salt was obtained, having an absorptivity of 10 liters $g^{-1}cm^{-1}$ at a wavelength of 425 m$\mu$. A 1000 g portion of this dye solution was diluted to 1157 g with water to a final absorptivity of 8.8 liters $g^{-1}cm^{-1}$. Thus, dye solutions (A) and (B) contain approximately equal amounts of dye, n-butanol, ethylene glycol, water and mixed alkanolamines.

Then, eight separate dye baths were prepared containing:

Comparison Set No. 1 – 6.6 g of dye solution (A) and 6.6 g of dye solution (B) (no additives);

Comparison Set No. 2 – 6.6 g of dye solution (A) and 6.6 g of dye solution (B), each with 0.66 g (10%) of the condensation product of one mole of a $C_{16-18}$tallowamine and 16 moles of ethylene oxide;

Comparison Set No. 3 – 6.6 g of dye solution (A) and 6.6 g of dye solution (B), each with 0.66 g (10%) of a polyethylene oxide-polypropylene oxide copolymer containing 10% ethylene oxide and 90% propylene oxide;

Examples 8 and 9 — 6.6 g of dye solution (A) and 6.6 g of dye solution (B), each with 0.66 g (10%) of said polyethoxylated $C_{16-18}$tallowamine and 0.66 g (10%) of said polyethylene oxide-polypropylene oxide copolymer.

Dye solution (A), i.e., Example 8, contains approximately 15.6% of the dye of the aforesaid general formula wherein R is Cl, as the mixed triisopropanolamine-diethanolamine salt, 30% of n-butanol, 15% of ethylene glycol, 5.6% of urea, 10% of polyethoxylated $C_{16-18}$tallowamine, 10% of polyethylene oxide-polypropylene oxide copolymer and 9% of water. The remainder consists of residual triisopropanolamine and diethanolamine.

Dye solution (B), i.e., Example 9, contains approximately 16% of the dye of the aforesaid general formula wherein R is H as the mixed triisopropanolamine-diethanolamine salt, 31% of n-butanol, 15.5% of ethylene glycol, 6.2% of urea, 10% of polyethoxylated $C_{16-18}$tallowamine, 10% of polyethylene oxide-polypropylene oxide copolymer and 6.7% of water. The remainder consists of residual triisopropanolamine and diethanolamine.

Each of the above compositions was diluted to 500 ml with hard water (i.e., water containing 85 parts per million (ppm) calcium chloride and 15 ppm magnesium sulfate). To each of the diluted compositions was added 500 ml of a 1% hard water solution of a purified natural gum thickener. After adjustment of the pH to 5.5 with acetic acid, the solutions were stirred thoroughly and then allowed to stand for 24 hours. The resultant solutions closely approximate the dye bath constituency used in conventional Kusters application.

Dye bath stability was determined by visual estimation of the amount of insolubles present after 24 hours standing at room temperature. The dye baths containing both the polyethylene oxide-polypropylene oxide copolymer and the polyethoxylated $C_{16-18}$tallowamine exhibited excellent dye bath stability, i.e., little or no insolubles were apparent after 24 hours standing. In contrast, the dye baths which contained no additives or only one of the aforesaid additives exhibited considerable to much dye precipitation and/or flocculation under similar conditions.

The embodiments of the invention in which an exclusive property or privilege is claimed are defined as follows:

1. the dye solution comprising by weight,
i. 10% to 20% of a dye of the formula

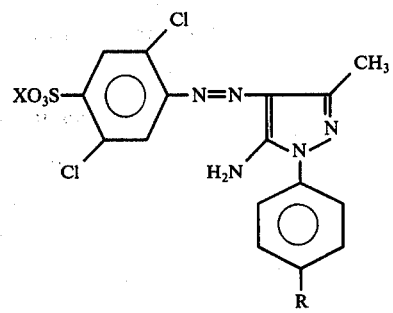

wherein R is H or Cl, and X is a mixture of di- and tri-$C_{1-4}$alkanolammonium,
ii. 15% to 30% of n-butanol,
iii. 10% to 20% of ethyleneglycol,
iv. 10% to 20% of nonionic polyethylene oxide-polypropylene oxide copolymer surfactant,
v. 5% to 10% of nonionic polyethoxylated aliphatic amine surfactant, and
vi. 0 to 50% water.

2. The dye solution of claim 1 comprising, by weight,
i. 15% to 17% of dye,
ii. 18% to 20% of n-butanol,
iii. 13% to 15% of ethyleneglycol,
iv. 10% to 12% of nonionic polyethylene oxide-polypropylene oxide copolymer surfactant,
v. 5% to 7% of nonionic polyethoxylated aliphatic amine surfactant, and
vi. 30% to 35% of water.

3. The dye solution of claim 1 wherein the nonionic surfactant (iv) is the polyethylene oxide-polypropylene oxide copolymer having a hydrophobic polypropylene oxide molecular weight of 1750, amd containing 10% by weight of ethylene oxide and 90% by weight of propylene oxide.

4. The dye solution of claim 1 wherein the nonionic surfactant (v) is obtained by reacting tallowamine with 16 moles of ethylene oxide per mole of amine.

5. The dye solution of claim 1 wherein the nonionic surfactant (iv) is polyethylene oxide - polypropylene oxide copolymer having a hydrophobic polypropylene oxide molecular weight of 1750, and containing 10% by weight of ethylene oxide and 90% by weight of propylene oxide, and the nonionic surfactant (v) is obtained by reacting tallowamine with 16 moles of ethylene oxide per mole of amine.

6. The dye solution of claim 2 wherein the non-ionic surfactant (iv) is the polyethylene oxide - polypropylene oxide copolymer having a hydrophobic polypropylene oxide molecular weight of 1750, and containing 10% by weight of ethylene oxide and 90% by weight of propylene oxide.

7. The dye solution of claim 2 wherein the non-ionic surfactant (v) is obtained by reacting tallowamine with 16 moles of ethylene oxide per mole of amine.

8. The dye solution of claim 2 wherein the non-ionic surfactant (iv) is polyethylene oxide - polypropylene oxide copolymer having a hydrophobic polypropylene oxide molecular weight of 1750, and containing 10% by weight of ethylene oxide and 90% by weight of propylene oxide, and the nonionic surfactant (v) is obtained by reacting tallowamnine with 16 moles of ethylene oxide per mole of amine.

9. The dye solution of claim 1 wherein the dye is 5-amino-4-(2',5'-dichloro-4'-sulfophenylazo)-3-methyl-1-phenylpyrazole.

10. The dye solution of claim 1 wherein the dye is 5-amino-4-(2',5'-dichloro-4'-sulfophenylazo)-3-methyl-1-p-chlorophenylpyrazole.

11. The dye solution of claim 2 wherein the dye is 5-amino-4-(2',5'-dichloro-4'-sulfophenylazo)-3-methyl-1-phenylpyrazole.

12. The dye solution of claim 2 wherein the dye is 5-amino-4-(2',5'-dichloro-4'-sulfophenylazo)-3-methyl-1-p-chlorophenylpyrazole.

13. The dye solution of claim 8 wherein the dye is 5-amino-4(2',5'-dichloro-4'-sulfonphenylazo)-3-methyl-1-p-chlorophenylpyrazole.

14. The dye solution of claim 2 comprising, by weight, 16% of the dye wherein R is Cl and X is a mixture of di- and triethanolammonium, 19% of n-butanol, 14% of ethyleneglycol, 10% of nonionic polyethylene oxide-polypropylene oxide copolymer surfactant, 6% of nonionic polyethoxylated aliphatic amine surfactant, and 35% of water.

* * * * *